(12) United States Patent
Guay et al.

(10) Patent No.: US 6,598,038 B1
(45) Date of Patent: Jul. 22, 2003

(54) WORKLOAD REDUCTION MECHANISM FOR INDEX TUNING

(75) Inventors: Todd Guay, Nashua, NH (US); Gregory Smith, Merrimack, NH (US); Geoffrey Wilson, Amherst, NH (US); Jay Rossiter, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/398,616

(22) Filed: Sep. 17, 1999

(51) Int. Cl.[7] ............................................. G06F 17/30
(52) U.S. Cl. ........................ 707/2; 707/10; 707/101; 707/205
(58) Field of Search ............... 707/2–6, 10, 100–104.1, 707/201, 205; 711/121, 122, 144; 714/11; 717/141

(56) References Cited

U.S. PATENT DOCUMENTS 5,404,510 A    4/1995  Smith et al. ................... 707/2
5,761,654 A  *  6/1998  Tow .............................. 707/101
5,960,423 A  *  9/1999  Chaudhuri et al. ............ 707/1
6,029,163 A  *  2/2000  Ziauddin ....................... 707/2

OTHER PUBLICATIONS

Oracle Enterprise Manager Oracle Expert User's Guide, 1996 Oracle Corporation, 500 Oracle Parkway, Redwood City, CA 94065, pp. 1–14.*

Oracle Enterprise Managers—Oracle Expert User's Guide, Release 1.3.5, Chapters 2, 4–12 (1996–1997 Oracle Corporation) (http://info–it.umsystem.edu/oradocs/doc/sysman/doc/A48513).

* cited by examiner

*Primary Examiner*—Shahid Alam
(74) *Attorney, Agent, or Firm*—Hamilton, Brook, Smith & Reynolds, P.C.

(57) ABSTRACT

A workload reduction mechanism for index tuning is described that selects relevant database statements from a database workload, standardizes a format of the relevant database statements and reduces the formatted, relevant database statements into a representative set of database statements. These statements may then be provided to an index tuning mechanism.

23 Claims, 6 Drawing Sheets

WORKLOAD REDUCTION MECHANISM FOR INDEX TUNING

BACKGROUND OF THE INVENTION

In a relational database system, individual records of data are stored in tables. Each table includes fields, or columns, of information and individual records are stored as rows, with a data entry in each column. Data may also be null within a column, which indicates no data was stored for that column. For example, in an employment database, there may be a table EMPLOYEES which includes columns such as employee ID, lastname, firstname, address, city, state and so forth. One record, including data in the several columns, would typically be entered in the EMPLOYEE table for each employee. Similarly, other tables may be established in accordance with the logical schema of the database. For example, a table SALARY HISTORY may include columns of salary history information, with each record being identified by an employee ID. Another table, MANAGERS, may include columns identifying information specific to managers and may also include the employee ID field. Relations between the tables would be established by reference to the columns which appear in multiple tables such as employee ID in the above example.

Operations on the data in a database are performed using a database access language. Structured Query Language (SQL) is a standard language for relational database management systems. SQL statements enable a user to perform database management operations, such as table or index creation, as well as to manipulate and extract the data contained in the database. For a given database system, the multiple SQL statements which are successfully executed by the database (garbage statements i.e. those including typographical errors, can be submitted but should not be considered part of the workload) comprise a workload of the system.

A major task in database management systems is in locating specific records within individual tables in response to the queries submitted to the database. Typically, the query statements identify one or more columns which are used as keys in the search process. The key is used to restrict the rows.in the table which the database system must evaluate to determine if they satisfy the query. For example, the EMPLOYEES table described in the above example may be searched for all employees who live in Boston, Mass. To that end, the system may scan through every entry in the EMPLOYEES table, specifically searching the city and state columns, to locate the desired records. In many instances, however, the table may span multiple pages and scanning the entire table may require multiple time consuming input/output (I/O) operations.

To reduce the time required to locate particular records, indexes may be established to map particular column values to records. Indexes provide more direct access to individual records, thus reducing search time, including costly I/O operations, to locate the records. Indexes, however, come with a cost of added storage space and an increase in time required to insert, delete or update records. Whenever a record is inserted or deleted, the system not only processes the record in the table, but also any indexes which include columns of the table. Further, updating a record can require relocation of the corresponding entry in one or more indexes.

An index tuning system looks at the logical schema and workload of a database, including specifics of tables and queries, to establish indexes which provide for efficient operation of the database system. One such index tuning system is presented in U.S. Pat. No. 5,404,510 in which the indexes are identified based on a detailed analysis of the workload with weight given to the importance of specific requests.

SUMMARY OF THE INVENTION

Typically, when an index tuning mechanism is implemented on a database, the database is tuned with respect to one or more "target" tables included within the database. One drawback of such a tuning system is that a workload associated with a given database often includes many statements which are not relevant to index tuning efforts. That is, many statements may reference non-target tables or may not affect data retrieval efforts within the database. As a result, the tuning mechanism wastes resources analyzing statements which are not relevant to the index tuning efforts.

In accordance with a workload reduction mechanism for index tuning, a method and apparatus is provided that selects relevant database query statements from a database workload, standardizes a format of the relevant database query statements and reduces the formatted, relevant database query statements into a representative set of database query statements. These statements can then be provided to an index tuning mechanism. With such an arrangement, the index tuning mechanism is able to tune the system in a shorter period of time and use less storage space while analyzing fewer statements.

In accordance with a further aspect of a workload reduction mechanism for index tunning, a system is provided that includes a database workload source which provides input to a workload filter. The workload filter selects relevant database query statements from the workload source and provides input to a formatting system. The formatting system standardizes a format of the relevant database query statements. The system also includes a hash table that includes a hash of each representative database query statement selected from the relevant database query statements.

Also provided is a computer program product to provide a workload reduction mechanism for index tuning.

BRIEF DESCRIPTION OF THE DRAWINGS

The foregoing and other objects, features and advantages of the invention will be apparent from the following more particular description of A Workload Reduction Mechanism for Index Tuning, as illustrated in the accompanying drawings in which like reference characters refer to the same parts throughout the different views. For clarity and ease of description, the drawings are not necessarily to scale, emphasis instead being placed upon illustrating the principles of the invention.

DETAILED DESCRIPTION

Figure 1:
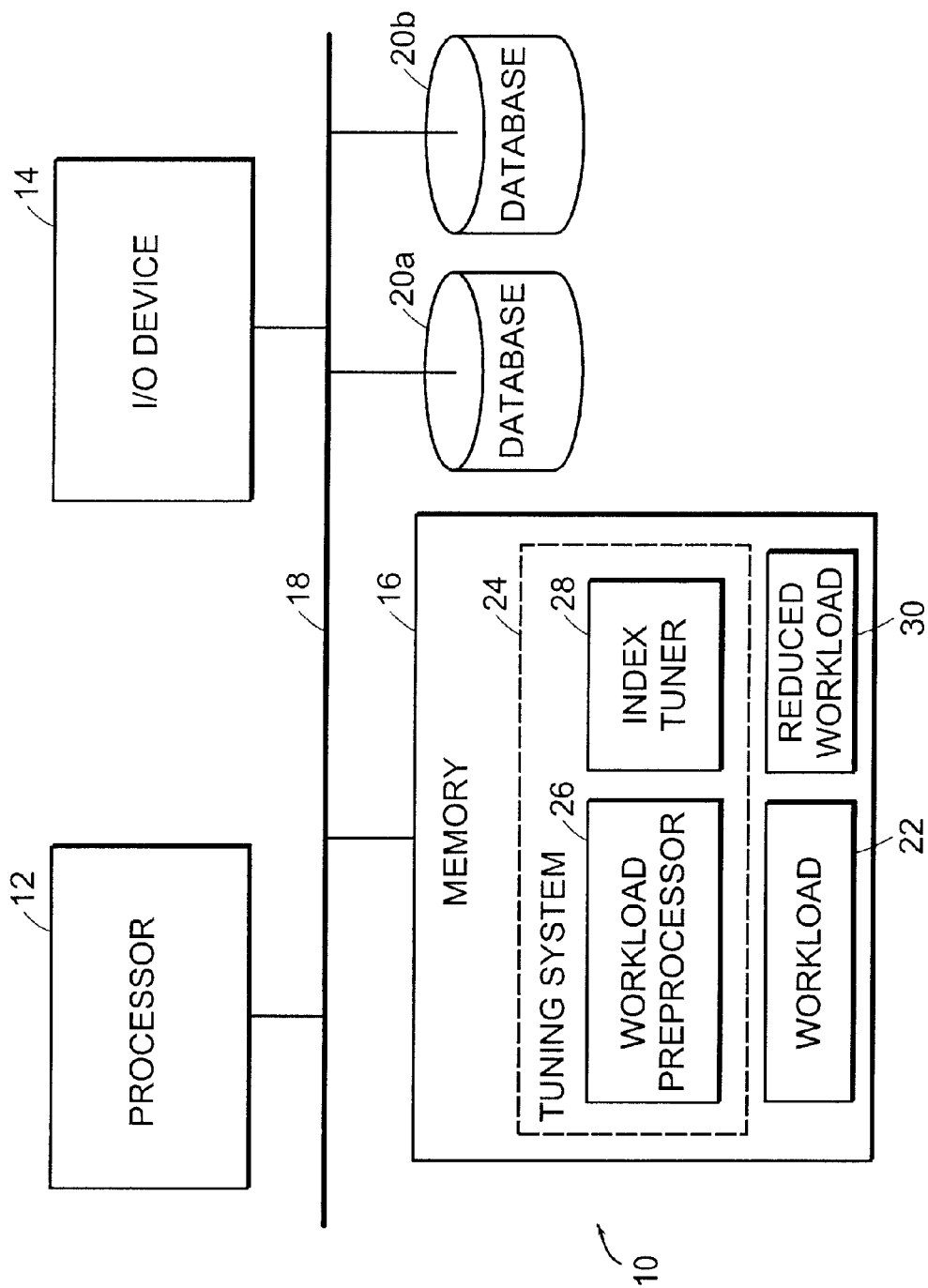
FIG. 1 is a schematic illustration of a database management system embodying a workload reduction mechanism for index tuning.

FIG. 1 is a schematic illustration of a database management system 10 embodying a work load reduction mechanism for index tuning. The database management system 10 is shown to include a processor 12, an IO device 14 and a system memory 16 connected by a system bus 18. Here the database is shown stored locally on storage disk 20A and storage disk 20B. It should be understood however, that the database can also be stored remotely on one or more 10 devices (not shown).

System memory 16 is shown to include a database workload 22. The database workload can reside in memory as shown, within the database, or in any other secondary storage. Typically, a database workload includes all database statements submitted to a database over a specified period of time. Several workload collection mechanisms can exist, three of which will be discussed below.

A first mechanism filters application code, searching the source code for all database statements. A second mechanism introduces either a software or hardware collection process to the database environment between an application and the database. The process reads database statements as they are submitted to the database for processing and writes the statements to memory. A third collection mechanism uses a database cache. Some database systems maintain an internal cache of frequently accessed database statements which have run against the database. This cache is typically used to share database statements between different users to save processing time, since the shared database statements do not have to be reparsed, however, the cache may also be used to collect workload information. For ease of explanation and clarity of description, the remainder of the description will assume that the database workload is provided by a database cache capturing SQL statements.

System memory 16 is further shown to include a tuning system 24, which operates on a database workload 22. The tuning system 24 includes a workload preprocessor 26 and an index tuner 28. The workload preprocessor 26 takes the database workload 22 as input and provides a reduced workload 30 to the index tuner 28.

As is well know, an index is created in a database to increase the performance of data retrieval. The index tuner 28 analyzes the indexes already created in the database system, as well as the database workload 22 run on the system, and modifies the existing indexes or, creates new indexes, to maximize the performance of the database system. When processing a request, a database system can use some or all of the available indexes to locate the requested rows efficiently. The index tuner 28 operates as described in U.S. Pat. No. 5,404,510 which is hereby incorporated by reference.

The database workload 22 includes all SQL statements submitted to the database over a period of time. Typically, not all SQL statements included in the database workload are of interest to the index tuner 28. That is, many of the statements may define or modify the structure of the database or address the security for the database. These types of SQL statements generally do not address data retrieval efforts and are therefore not relevant to the index tuner 28. Therefore, to provide the complete database workload 22 to the index tuner 28 may be inefficient and wasteful of processing resources. Accordingly, the workload preprocessor 26 reduces a workload of a database system, such that the index tuner 28 can operate more efficiently.

Figure 2:
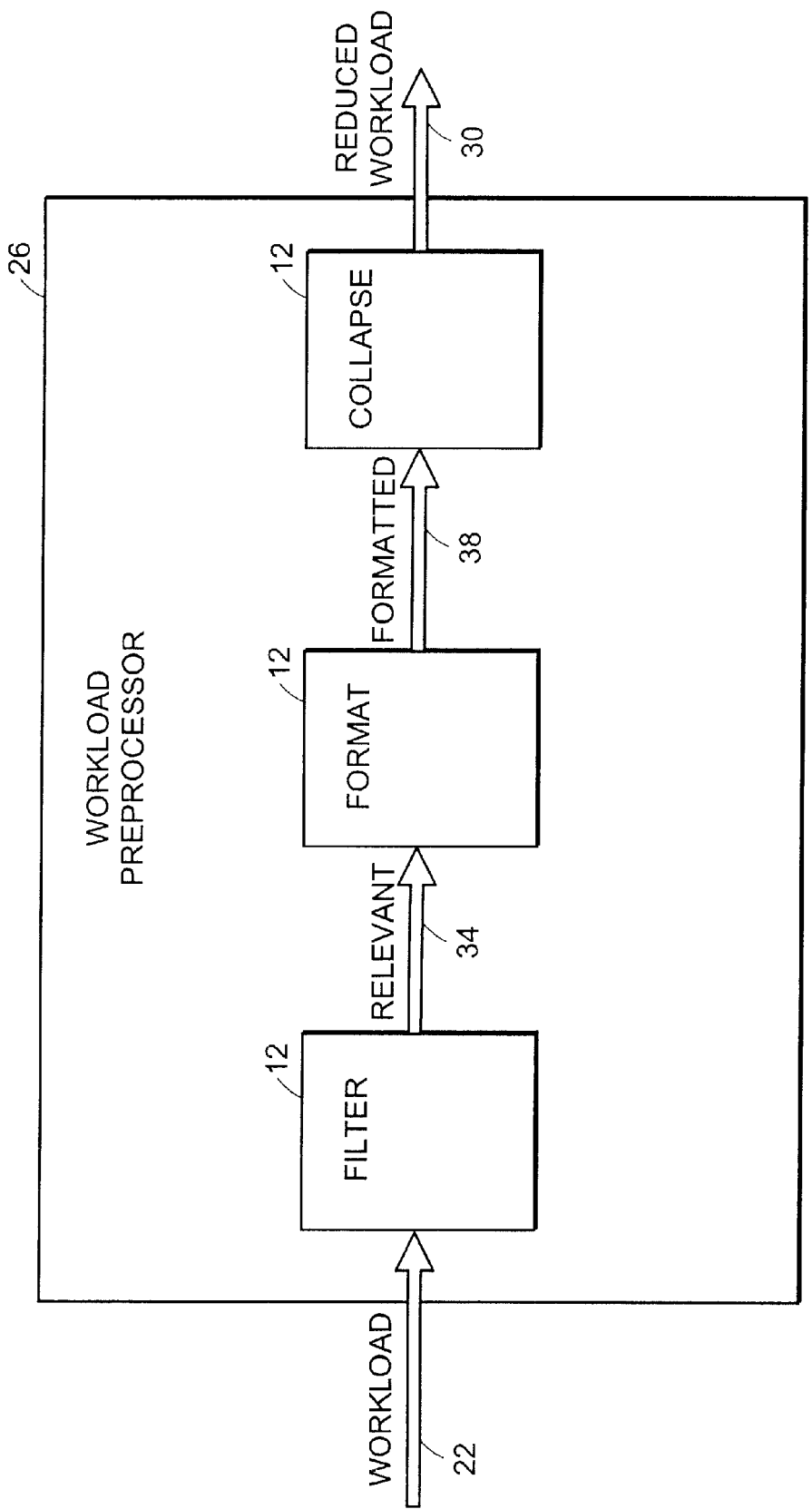
FIG. 2 is a block diagram illustrating the internal organization of the workload preprocessor of FIG. 1.

FIG. 2 is a block diagram illustrating the internal organization of the workload preprocessor 26 of FIG. 1. The workload preprocessor 26 is shown to include a filter component 22, a format component 36 and a collapse component 40, all connected in series. That is, the filter component 32 provides at its output, input to the format component 36 which in turn provides at its output, input to the collapse component 40.

By way of background, SQL statements may be divided into multiple categories. The more common of these categories are Data Definition Language (DDL) statements and Data Manipulation Language (DML) statements. DDL statements define a database, modify its structure and destroy it after it is no longer needed. DML statements enter data into the database, change the data or read data from the database.

The database workload 22 is provided to the filter component 32, which analyzes the database workload 22 and selects those database query statements that are relevant to the tuning system 24. When tuning a database, the tuning mechanism typically tunes the database for optimal performance with respect to one or more particular tables included in the database. Specifically, the filter component 32 screens the database workload 22 to select DML statements which are directed at a target table. DDL statements, which define and destroy a database, provide little, if any, information regarding the data retrieval efforts for a particular database and as such may be ignored for index tuning purposes. After filtering the database workload 22, the filter component 32 provides the relevant statements 34 to the format component 36.

SQL, like many database access languages, is a simple but powerful computer programming language. Rather than defining many complex instructions, SQL provides a few basic instructions which can be grouped and ordered to perform the requisite tasks. In addition, there are few constraints on the syntax of an SQL statement. As a result of all this "programming freedom", two separate users, endeavoring to formulate the same query, commonly generate physically different statements. These physical differences may be as basic as the spacing or occurrence of carriage returns within the statement or may be as complex as the use of complex conditionals in a statement. Moreover, from the standpoint of the index tuner 28, two apparently different statements are, in reality, similar for the purpose of index evaluation. In an effort to better analyze the workload 22 of the database management system 10, therefore, the format component 36 takes the relevant statements 34 and reformats those statements into a single, common, syntactical format. A more detailed description of the format component 36 is provided below with reference to FIG. 4 and FIG. 5.

These formatted, relevant statements are provided to the collapse component 40. The collapse component 40 analyzes the formatted relevant statements 38 and provides at its output, a reduced workload 30. The reduced workload 30 includes a set of database statements, representative of the database statements included in the database workload 22, provided in a single, common format.

Figure 3:
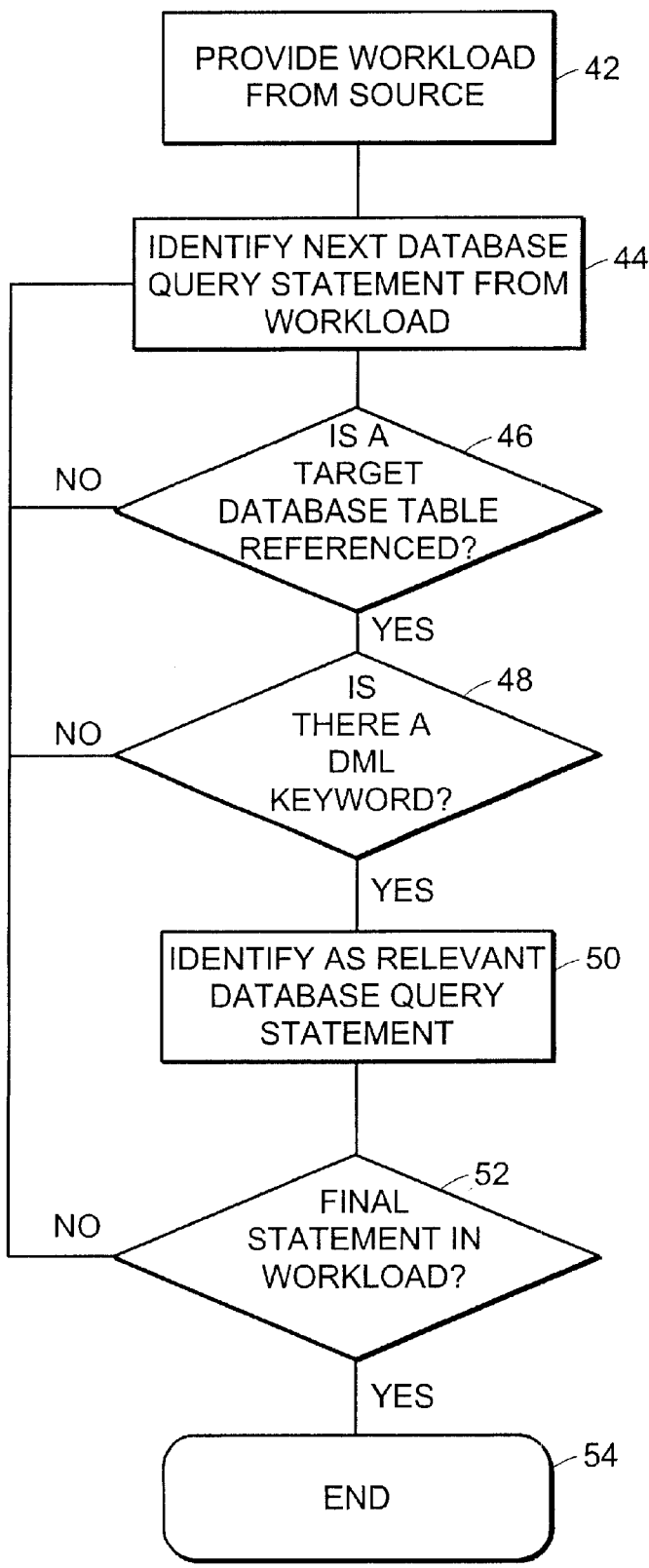
FIG. 3 is a flow diagram of the filtering process implemented by the filter component of FIG. 2.

FIG. 3 is a flow diagram of the filtering process implemented by the filter component of FIG. 2. The filtering process begins at step 42 where the workload is provided from a source. As previously described, multiple mechanisms are available for collecting a database workload. For ease of explanation, it is assumed that the database workload has been provided by a database cache. It should be apparent to one of ordinary skill in the art however, that the technique which will be described below may be applied to any of the workload collection mechanisms previously described.

At step 44, a database statement is identified from the database workload and, at step 46, a query is made as to whether the identified database statement references a target database table. To determine whether the database statement references a target table, an actual name of the table to which a table synonym or table alias referenced in the statement refers is ascertained. Generally, a dependency table exists which cross references synonyms and aliases to actual table names.

If the database statement does not reference a target database table, the database statement is not classified as a relevant statement. No further filtering of this statement is necessary. Therefore, flow returns to step 44 where a next database statement is identified.

If, however, it is determined at step 46 that the database statement does reference a target database table, step 46 is followed by step 48. At step 48, a query is made as to whether the database statement includes a data manipulation language key word. In the SQL database query language, four database manipulation language keywords are provided. These keywords are INSERT, UPDATE, DELETE and SELECT. If no DML keyword is included in the database statement at step 48, control returns to step 44 where a next database statement is identified from the workload. If however, a DML keyword is included in the database statement, the database statement is classified as a relevant database statement at step 50. If this is the last database statement included in the database workload 22 as determined at step 52, the process ends at step 54. If, however, it is not the final statement, a next database statement is identified at step 44.

Once the relevant database statements 34 have been selected from the database workload 22 by the filter component 32, they are provided to the format component 36. The format component standardizes the format and content of the relevant database statements 34 to provide a set of database statements which may be analyzed by the collapse component 40.

Figure 4:
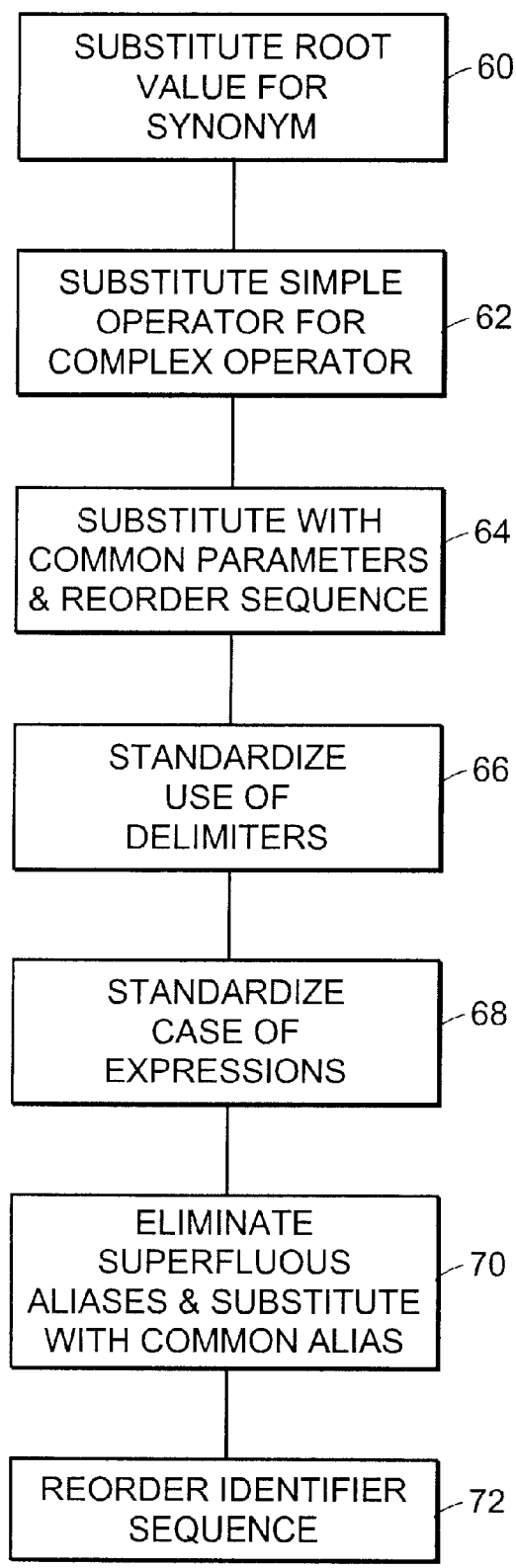
FIG. 4 is a flow diagram of the workload collapse process implemented by the collapse component of FIG. 2.

FIG. 4 is a flow diagram of the database statement formatting process implemented by the format component 36 of FIG. 2. The format component 36 reformats each of the relevant database statements 34 to make them appear as similar as possible. As described above, a database workload 22 is a collection of all database statements run on a database for a period of time. Each of these statements may have been written and submitted by different people thus representing an individual writing style of each of those people. As a result, a logically identical query, submitted by a number of different people, may each be physically different from one another even though they provide the same data at output and further are identical from an index tuning standpoint. Accordingly, the format component 36 analyzes each database statement and rewrites the statement according to consistent, syntactical rules.

For each relevant database statement 34 identified by the filtering process of FIG. 3, a synonym, included in the relevant database statement, is substituted with a root value for the synonym at step 60. A synonym is another name for a table, view, sequence or program unit, providing a direct reference to the object. Synonyms can be public or private and are typically used for security or convenience reasons. For example, synonyms can mask the name and owner of an object, provide public access to an object, and simplify an SQL statement for a database user. For example, in a table called SALES_DATA in a schema owned by a user KFERGUSON, a query to the table would be made with the statement:

SELECT*FROM kferguson.sales_data;

To simplify this SQL statement, and any other statement which references this table, a synonym for the table name is created, SALES. The synonym is created in a separate SQL statement. Referencing the table using the synonym for the table, the statement becomes:

SELECT*FROM sales;

As described above, the format component 36 replaces each synonym with the root value for the synonym. A root value of a synonym is a most basic form of the value. That is, in the example above, the root value of the synonym SALES is KFERGUSON.SALES_DATA. As a result, for each occurrence of the synonym SALES in the relevant database statements 34, the identifier KFERGUSON.SALES_DATA is substituted.

Once all synonyms have been removed from the relevant database statement 34, simple operator phrases are substituted for complex operator phrases at step 62. In SQL, as in other database query languages, a number of operators are used to create conditionals in a WHERE clause within a statement. Examples of such operators are:

=,<,>, AND, OR, NOT and IN.

In many cases, these operators are combined to form complex conditionals such as testing for one or more identifiers to be equal to all values (AND) or, to be equal to one or more values (OR) or, to be one in a list of values (IN). From an index tuning perspective however, after an identifier is tested once, each additional test of the same identifier need not be represented in the query statement. This is because each additional query of the identifier adds no additional information regarding data retrieval efforts other than a frequency value which can be stored with the reformatted statement rather than represented in the statement. In addition to simplifying the conditional statements, the wildcard operator * is replaced in a statement with the actual names of each of the columns in the table at step 62.

At step 64, a common parameter naming convention is implemented and the sequence of the parameters are reordered. That is, SQL statements often query a database to provide each record where an entry in a column of the record is equal to a literal such as a last name, an ID number, etc. Here, the format component 36 substitutes a parameter for the literal. In addition, SQL allows a user to include parameters in a SQL statement. These user defined parameters, which are typically referred to as bound variables, are also replaced using the same common parameter naming convention. After substitution, the parameters may be reordered to a standard order such as an alphabetical order.

At step 66, the use of delimiters in a database statement is standardized. That is, all white space and carriage returns occurring within a single database statement are substituted with a single space. One or more spaces between expressions in a statement as well as one or more carriage returns within a statement are allowed in SQL. Often times, these additional spaces or carriage returns are included to enhance the human readability of an SQL query statement. Therefore, to make analysis and comparison of the database statements simpler, these additional spaces and carriage returns are removed at step 66. In addition to additional white space and carriage returns, parenthesis are often added to a statement to improve readability. These superfluous parenthesis are also removed at step 66.

At step 68, expressions within the database statement are converted from case non-specific to case consistent throughout the query statement. That is, the database statement is rewritten as all capital letters or, in the alternative, as all lowercase letters. A common practice of some users is to capitalize all SQL keywords within a SQL statement while writing all remaining expressions in lowercase characters. By rewriting the statement in a consistent case, comparison of the statements during the collapse process implemented by the collapse component 40 is simplified.

At step 70, the use of aliases within a database statement is standardized. That is, all superfluous aliases are removed and a common aliases naming convention is followed, substituting each alias with a preselected, common alias. An alias is an alternate method of referencing a table in the database. In database statements which reference multiple tables, aliases may be used to assist in keeping track of which column name belongs to which table. An example is provided below:

SELECT A.last_name, B.last_name
   FROM EMP A MGR B
      WHERE A.dept=B.dept;

Here, the aliases A and B are used to reference the two tables EMP and MGR. In an instance such as this, use of the aliases is advantageous because they are used to distinguish between the last_name and dept columns which occur in both tables. There are occasions however, where an alias is superfluous. Take, for instance, the following SQL statement:

SELECT A.last_name FROM EMP A WHERE id=195;

Here, the alias A is unnecessary and is eliminated by the format component 36 at step 70. Once all superfluous aliases are removed, any remaining aliases are renamed in a predetermined manner and are reordered to a preselected order, such as an alphabetical order.

At step 72, identifiers occurring within the database statement are reordered to a predetermined, identifier sequence. An identifier is an expression in the database statement that identifies tables or column names. In the above example, A.last_name, EMP and id are identifiers. Here, the identifiers are reordered, typically alphabetically.

Figure 5:
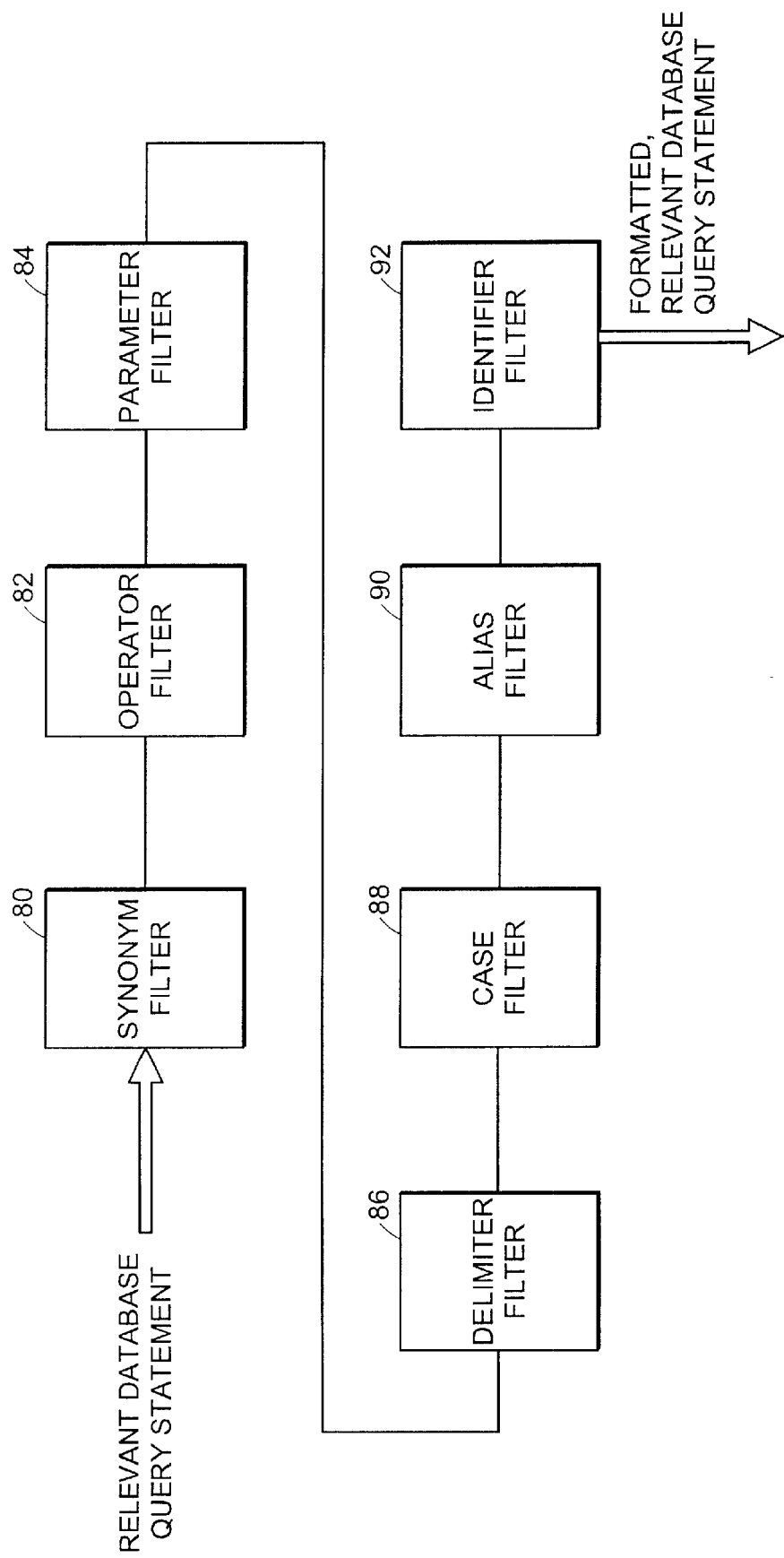
FIG. 5 is flow diagram of the database query statement formatting process implemented by the format component of FIG. 2.

FIG. 5 is a block diagram illustrating the internal organization of the format component 36 of FIG. 2. The format component 36 is shown to include a collection of seven filters, connected in series. The filters include a synonym filter 80, an operator filter 82, a parameter filter 84, a delimiter filter 86, a case filter 88, an alias filter 90 and an identifier filter 92. The ordering of these filters are for illustrative purposes only. One of ordinary skill in the art would appreciate that various ordering arrangements are possible, each yielding a similar result to the arrangement shown.

The operation of these filters will be described in conjunction with an example including two sample tables and a sample workload. The two tables provided are Employee, (Table 1), and Customer, (Table 2). Only the column headings are shown in the tables. The sample workload is provided in Table 3 and includes only relevant database statements.

TABLE 1

| Employee | | | | | | | | |
|---|---|---|---|---|---|---|---|---|
| id | first_name | last_name | address | city | state | department | job_code | salary |

TABLE 2

| Customer | | | | | | | |
|---|---|---|---|---|---|---|---|
| id | company_name | address | city | state | contact_name | salesperson_id |

TABLE 3

Workload

A  Select last_name, address From employee Where id = 1;
B  select Address, Last_Name from employee where id = :5;
C  SELECT address
   from employee
     where first_name = 'Monique';
D  SELECT address FROM emp WHERE first_name = :1;
E  SELECT E.LAST_NAME, E.ADDRESS FROM EMPLOYEE E
   WHERE E.ID = 5;
F  select * from employee where id = :5 and salary > 25000;
G  SELECT emp.last_name, cust.company_name, cust.id
   FROM employee emp, customer cust
     WHERE emp.id = ID AND cust.salesperson_id = ID;
H  select C.company_name, C.id, E.last_name from customer C,
   employee E where (C.salesperson_id=195 OR
   C.salesperson_id=359) AND (E.id=195 OR E.id=359);

The employee table is shown to include the following nine columns: id, first_name, last_name, address, city, state, department, job_code and salary. The customer table is shown to include the following seven columns: id, company_name, address, city, state, contact_name and salesperson_id. The SQL statements in the workload table are labeled with a single character reference, letters A–H.

Provided below, in Table 4, is a progression of the format of the statements as they are processed by each of the filters. Table 4 is shown to include the statement identifier, a reference character for the filter which is processing the statement, and the resulting statement format after processing by the identified filter.

TABLE 4

A  (84)  Select last_name, address From employee
         Where id = :PARAM;
   (86)  Select last_name, address From employee
         where id = :PARAM;
   (88)  SELECT LAST_NAME, ADDRESS FROM EMPLOYEE
         WHERE ID = :PARAM;
   (92)  SELECT ADDRESS, LAST_NAME FROM EMPLOYEE
         WHERE ID = :PARAM;
B  (84)  select Address, Last_Name from employee
         where id=:PARAM;
   (86)  select Address, Last_Name from employee
         where id = :PARAM;
   (88)  SELECT ADDRESS, LAST_NAME FROM EMPLOYEE
         WHERE ID = :PARAM;
C  (84)  SELECT address
        from employee
           where first_name = :PARAM;
   (86)  SELECT address from employee where
        first_name = :PARAM;

TABLE 4-continued

|   |      |   |
|---|------|---|
|   | (88) | SELECT ADDRESS FROM EMPLOYEE WHERE FIRST_NAME = :PARAM; |
| D | (80) | SELECT address from EMPLOYEE where first_name = :1; |
|   | (84) | SELECT address from EMPLOYEE where first_name = :PARAM; |
|   | (88) | SELECT ADDRESS FROM EMPLOYEE WHERE FIRST_NAME = :PARAM; |
| E | (84) | SELECT E.LAST_NAME, E.ADDRESS FROM EMPLOYEE E WHERE E.ID = :PARAM; |
|   | (90) | SELECT LAST_NAME, ADDRESS FROM EMPLOYEE WHERE ID= :PARAM; |
|   | (92) | SELECT ADDRESS, LAST_NAME FROM EMPLOYEE WHERE ID= :PARAM; |
| F | (82) | select ADDRESS, CITY, DEPARTMENT, FIRST_NAME, ID, JOB_CODE, LAST_NAME, SALARY, STATE from employee where id = :5 and salary > 25000; |
|   | (84) | select ADDRESS, CITY, DEPARTMENT, FIRST_NAME, ID, JOB_CODE, LAST_NAME, SALARY, STATE from employee where id = :PARAM and salary > :PARAM; |
|   | (88) | SELECT ADDRESS, CITY, DEPARTMENT, FIRST_NAME, ID, JOB_CODE, LAST_NAME, SALARY, STATE FROM EMPLOYEE WHERE ID = :PARAM AND SALARY > :PARAM; |
| G | (84) | SELECT emp.last_name, cust.company_name, cust.id FROM employee emp, customer cust WHERE emp.id = :PARAM AND cust.salesperson_id = :PARAM; |
|   | (86) | SELECT emp.last_name, cust.company_name, cust.id FROM employee emp, customer cust WHERE emp.id = :PARAM AND cust.salesperson_id = :PARAM; |
|   | (88) | SELECT EMP.LAST_NAME, CUST.COMPANY_NAME, CUST.ID FROM EMPLOYEE EMP, CUSTOMER CUST WHERE EMP.ID = :PARAM AND CUST.SALESPERSON_ID = :PARAM; |
|   | (90) | SELECT B.LAST_NAME, A.COMPANY_NAME, A.ID FROM EMPLOYEE B, CUSTOMER A WHERE B.ID = :PARAM AND A.SALESPERSON_ID = :PARAM; |
|   | (92) | SELECT A.COMPANY_NAME, A.ID, B.LAST_NAME FROM CUSTOMER A, EMPLOYEE B WHERE A.SALESPERSON ID = :PARAM AND B.ID = :PARAM, |
| H | (82) | select C.company_name, C.id, E.last_name from customer C, employee E where (C.salesperson_id=195) AND (E.id=195); |
|   | (84) | select C.company_name, C.id, E.last_name from customer C, employee E where (C.salesperson_id=:PARAM) AND (E.id=:PARAM); |
|   | (86) | select C.company_name, C.id, E.last_name from customer C, employee E where C.salesperson_id = :PARAM AND E.id = :PARAM; |
|   | (88) | SELECT C.COMPANY_NAME, C.ID, E.LAST_NAME FROM CUSTOMER C, EMPLOYEE E WHERE C.SALESPERSON_ID = :PARAM AND E.ID = :PARAM; |
|   | (90) | SELECT A.COMPANY_NAME, A.ID, B.LAST_NAME FROM CUSTOMER A, EMPLOYEE B WHERE A.SALESPERSON_ID = :PARAM AND B.ID = :PARAM; |

As may be seen in Table 4, statement A is first reformatted by the parameter filter 84 which replaces the literal "1" with the character string ":PARAM". The parameter filter 84 also reorders the parameters to a predefined order, however, as only one parameter is included in statement A, reordering is not required. Because statement A does not include a synonym, it is passed, unaltered, through the synonym filter 80. The only operator included in statement A, the equal sign (=), cannot be further simplified by the operator filter 82 and as such, the statement passes through the operator filter 82 unaltered as well.

The delimiter filter 86 processes statement A, standardizing the spacing of the statement by adding a single space between the comma after the identifier last_name and the identifier address. The case filter 88 converts all expressions in statement A to uppercase letters. Alternatively, the case filter 88 can convert the statement to all lowercase letters as well, as long as all statements from the workload are handled the same way. Statement A does not include any aliases so it is passed, unaltered, through the alias filter 90. The final reformatting of statement A is performed by the identifier filter 92 which reorders the identifiers "last_name" and "address" to be listed in the statement alphabetically.

Statement B, as may be seen in table 4, is processed by three of the filters, the parameter filter 84, the delimiter filter 86 and the case filter 88. The parameter filter 84 replaces the bound variable ":5" with the character string ":PARAM". The delimiter filter 86 adds a space on either side of the equal sign (=). Finally, the case filter 88 converts all expressions in statement B to uppercase characters.

Again, as with statements A and B, statement C passes through the synonym 80 and operator 82 filters unaltered. The literal "Monique" in statement C is replaced with the string ":PARAM" by the parameter filter 84. Statement C includes carriage returns within the statement. The delimiter filter 86 removes these carriage returns and replaces each of them with a single space and then, the entire statement is capitalized by the case filter 88.

Statement D includes a synonym, emp, for the employee table. The synonym filter 80 determines the root value for the synonym and replaces the synonym with the root value, employee, in the statement. As described above, synonym information is typically stored in a lookup table which cross references a synonym with its root value. The parameter filter 84 replaces the bound variable ":1" with the string ":PARAM" and then the statement is capitalized by the case filter 88.

Statement E is first parsed by the parameter filter 84 which replaces the literal "5" with the character string ":PARAM". Statement E is already capitalized so it passes through the case filter 88 to the alias filter 90. The alias filter 90 identifies the alias "e" in the statement and determines whether this alias is superfluous. Here, the alias is superfluous as only a single table is referenced in the statement and therefore there is no need to differentiate between similarly named columns in two different tables. Accordingly, the alias filter 90 removes the alias and all references to it in the statement. The identifier filter 92 then reorders the "address" and "last_name" identifiers.

Statement F includes a wildcard operator which is expanded out to the names of each of the columns by the operator filter 82. The remaining operators in the statement, ">", "and" and "=" cannot be further simplified by the operator filter 82 and therefore remain unaltered. The literal "25000" and the bound variable ":5" are each replaced with the string ":PARAM" by the parameter filter 84. Finally, the case filter 88 converts the statement to uppercase characters.

Statement G is reformatted by five of the filters, the parameter filter 84, the delimiter filter 86, the case filter 88, the alias filter and the identifier filter 92. The parameter filter 84 replaces the user provided parameter "ID" with the character string ":PARAM" in both locations. The delimiter filter 86 replaces the carriage returns with a single space and the case filter 88 capitalizes the statement. The alias filter 90 parses the statement and identifies two aliases, "emp" and "cust". In statement G, two tables re referenced which have similarly named columns. Accordingly, neither of the aliases re superfluous. The alias filter 90 replaces the aliases with simple, preselected aliases, ere using the characters A and B. Any character strings may be used as long as each alias in a single workload is replaced in a consistent manner. It is also important to assign the aliases consistently, always assigning the same alias to a particular table.

Statement H is also reformatted by five of the filters, the operator filter 82, the parameter filter 84, the delimiter filter 86, the case filter 88 and the alias filter 90. Statement H includes two OR expressions connected by a single AND operator. Because each OR is logically comparing the same identifiers and simply testing these operators against two literals, each OR expression may be reduced into one or the other test for equality against a literal. Here, they are both reduced to include only the first equality expression by the operator filter 82. The parameter filter 84 replaces the literals with the character string ":PARAM" and the delimiter filter 86 standardizes the spacing around the equal (=) signs in the statement and removes the unnecessary parenthesis. The case filter 88 capitalizes the statement.

Statement H includes aliases which are analyzed by the alias filter 90. Here, as in statement G, the aliases are found not to be superfluous and therefore the aliases are replaced with aliases conforming to a consistent naming scheming such as here where they are replaced with single characters of the alphabet beginning with the letter A.

The resulting reformatted, relevant database query statements are provided below in Table 5.

TABLE 5

| | |
|---|---|
| A | SELECT ADDRESS, LAST_NAME FROM EMPLOYEE WHERE ID = :PARAM; |
| B | SELECT ADDRESS, LAST_NAME FROM EMPLOYEE WHERE ID = :PARAM; |
| C | SELECT ADDRESS FROM EMPLOYEE WHERE FIRST_NAME = :PARAM; |
| D | SELECT ADDRESS FROM EMPLOYEE WHERE FIRST_NAME = PARAM; |
| E | SELECT ADDRESS, LAST_NAME FROM EMPLOYEE WHERE ID = :PARAM; |
| F | SELECT ADDRESS, CITY, DEPARTMENT, FIRST_NAME, ID, JOB_CODE, LAST_NAME, SALARY, STATE FROM EMPLOYEE WHERE SALARY ID = PARAM AND SALARY > :PARAM; |
| G | SELECT A.COMPANY_NAME, A.ID, B.LAST_NAME FROM CUSTOMER A, EMPLOYEE B WHERE A.SALESPERSON.ID :PARAM AND B.ID = :PARAM; |
| H | SELECT A.COMPANY_NAME, A.ID, B.LAST_NAME FROM CUSTOMER A, EMPLOYEE B WHERE A.SALESPERSON.ID = :PARAM AND B.ID = :PARAM; |

Figure 6:
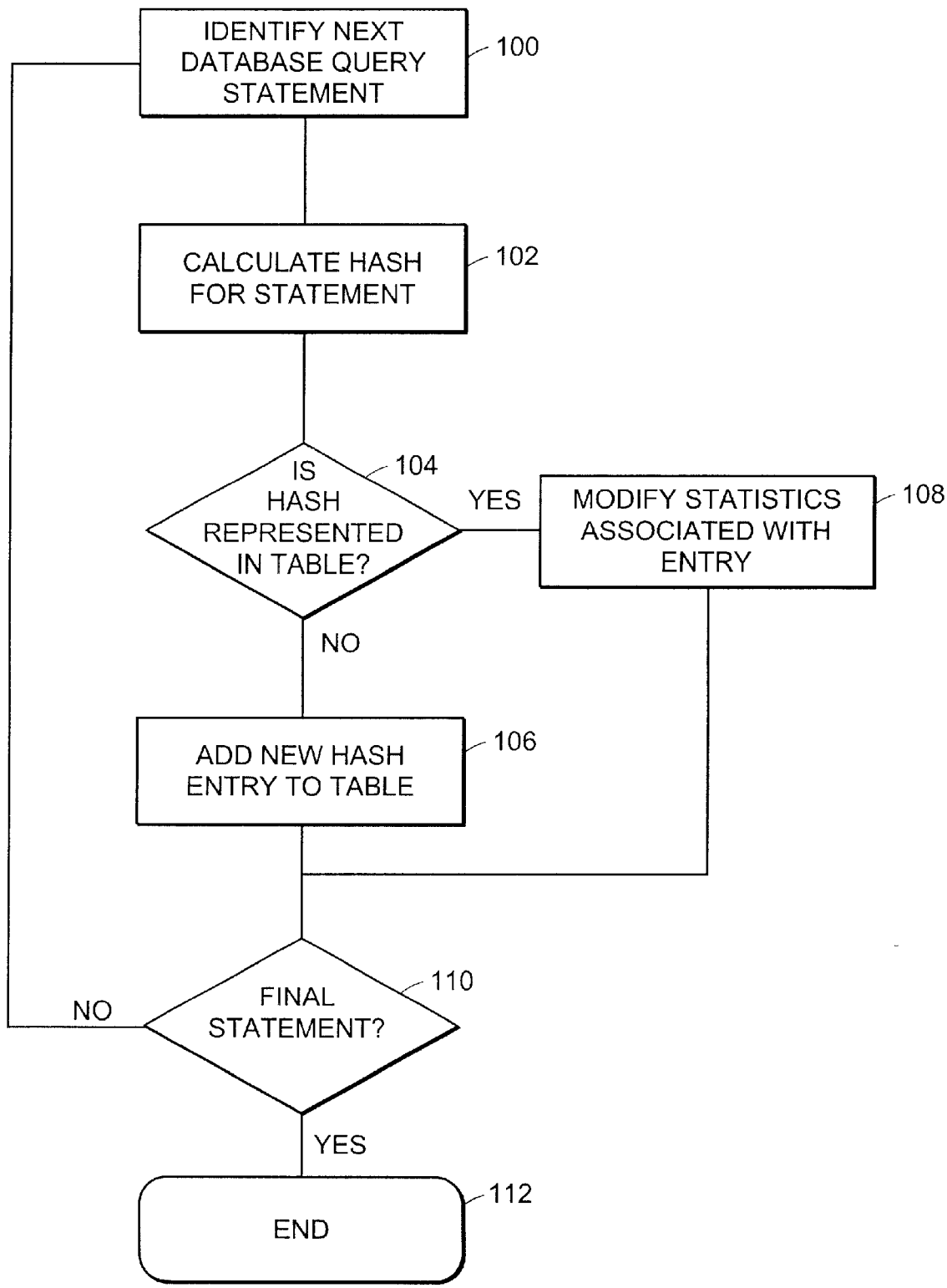
FIG. 6 is a block diagram illustrating the internal organization of the format component of FIG. 2.

FIG. 6 is a flow diagram of the workload collapse process implemented by the collapse component 40 of FIG. 2. The collapse process begins at step 100 where the next database query statement is identified from the reformatted, relevant database statements 38 provided from the format component 36. A hash key is calculated for the database query statement at step 102. The hash key uses an algorithm which generates a value that is unique to a given SQL statement, such as the MD5 message digesting algorithm. The hash key of the statement is compared to entries in a hash table at step 104 to determine whether the hash key is already represented as an entry in the hash table. The hash table includes hashes of prior statements. If, at step 104, it is determined that the hash key of the statement is not already in the hash table, a new entry for the statement is added to the table at step 106. If the hash key matches an entry in the table, however, statistics associated with the entry are modified at step 108. These statistics may represent a count of matching hashes, indicating a match of the statement, or other information such as a number of input/output operations executed by the statements or an amount of memory used by the statement.

At step 110, the process determines whether this is the final statement. If it is not the final statement, the process returns to step 100 where a next database statement is identified. If it is the final statement, the process ends at step 112. The output of the process is a table representing each unique statement and associated statistics derived from additional subsequent occurrences of the same statements. It is this final selection of statements which is provided to the index tuner 28 of FIG. 1.

Provided below in Table 6 is a representative output of the collapse process using the information from Table 5 as input. As may be seen, the workload has been reduced to include only four statements. In the far left column, a label is included which represents which statements have been reduced into the final form of the statement provided in the second column.

TABLE 6

| | |
|---|---|
| A, B | SELECT ADDRESS, LAST_NAME FROM EMPLOYEE WHERE ID = :PARAM; |
| C, D | SELECT ADDRESS FROM EMPLOYEE WHERE FIRST_NAME = :PARAM; |
| F | SELECT ADDRESS, CITY, DEPARTMENT, FIRST_NAME, ID, JOB_CODE, LAST_NAME, SALARY, STATE FROM EMPLOYEE WHERE SALARY ID=PARAM AND SALARY > :PARAM; |
| G, H | SELECT A.COMPANY_NAME, A.ID, B.LAST_NAME FROM CUSTOMER A, EMPLOYEE B WHERE A.SALESPERSON.ID = :PARAM AND B.ID = :PARAM, |

It will be apparent to those of ordinary skill in the art that methods involved in A Workload Reduction Mechanism for Index Tuning may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

It should be noted that, although the description references SQL, the techniques described herein for providing a workload reduction mechanism for index tuning can be applied to any database query language and should not be construed as applying solely to SQL. Moreover, the formatting operation should not be limited to the discussed operations. The type of ordering of the individual formatting operations are for illustrative purposes only. It will be apparent to ordinary skill in the art that fewer or additional formatting operations can be appropriate given the specific nature of a particular database system and associated workload.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An automated method for reducing a database workload to a representative set of database statements, the method comprising:

selecting relevant database statements from the database workload;

processing the relevant database statements into a standardized format;

for each relevant database statement, executing at least one standardization rule from:

substituting a root value for a synonym in a relevant database statement;

substituting a simple operator keyword segment for a complex operator keyword segment in the relevant database statement;
substituting a common parameter for a parameter in the relevant database statement;
reordering a sequence of parameters in the relevant database statement to a predefined, parameter sequence;
standardizing use of delimiters in the relevant database statement;
standardizing a case of each expression in the relevant database statement;
eliminating a superfluous alias in the relevant database statement;
substituting a common alias for an alias in the relevant database statement; and
reordering a sequence of identifiers in the relevant database statement to a predefined, identifier sequence; and
reducing the formatted, relevant database statements into a representative set of database statements.

2. The method of claim 1, wherein selecting relevant database statements comprises:
selecting a database statement from the database workload if the database statement references a target database table.

3. The method of claim 1 wherein selecting relevant database statements comprises:
selecting a database statement from the database workload if the database statement includes a Data Manipulation Language (DML) keyword.

4. The method of claim 1 wherein reducing the formatted, relevant database statements comprises:
providing a hash table;
determining a first hash key for a first one of the formatted, relevant database statements;
storing the first hash key in the hash table;
determining a second hash key for a second one of the formatted, relevant database statements;
comparing the second hash key to the stored, first hash key; and
storing the second hash key in the hash table if there is no match between the second hash key and the stored first hash key.

5. The method of claim 4 wherein reducing the formatted, relevant database statements further comprises:
modifying a statistic associated with the stored, first hash key if there is a match between the second hash key and the stored first hash key.

6. An automated system for providing a reduced database workload to an index tuning mechanism, the system comprising:
a database workload source;
a workload filter, fed by the workload source, to select relevant database statements from the workload source;
a formatting system, fed by the workload filter, to standardize a format of the relevant database statements;
the formatting system including at least one of:
a synonym filter to standardize a representation of each occurrence of a synonym in the relevant database statements;
an operator filter to standardize a representation of each occurrence of an operator in the relevant database statements;
a parameter filter to standardize a representation of each occurrence of a parameter in the relevant database statements;
a delimiter filter to standardize usage of a delimiter in the relevant database statements;
a case filter to standardize a case of each expression in the relevant database statements;
an alias filter to standardize a representation of each occurrence of an alias in the relevant database statements; and
an identifier filter to standardize a representation of each occurrence of an identifier in the relevant database statements; and
a mechanism to collapse the standardized database statements into a unique set of statements.

7. The system of claim 6 wherein the collapse mechanism further includes:
a hash table including a hash key of each representative database statement selected from the relevant database statements and
a statistic associated with each hash key.

8. The system of claim 6 wherein the parameter filter includes rules for replacing bound variables, literals, and user provided variables with a standardized character string.

9. The system of claim 6 wherein the parameter filter includes rules for replacing bound variables, literals, and user provided variables with a standardized character string.

10. A computer program product for reducing a database workload to a representative set of database statements, the computer program product comprising:
a computer usable medium having computer readable code therein, including program code for:
selecting relevant database statements from the database workload;
processing the relevant database statements into a standardized format, for each relevant database statement;
for each relevant database statement, executing at least one standardization rule from:
substituting a root value for a synonym in a relevant database statement;
substituting a simple operator keyword segment for a complex operator keyword segment in the relevant database statement;
substituting a common parameter for a parameter in the relevant database statement;
reordering a sequence of parameters in the relevant database statement to a predefined, parameter sequence;
standardizing a case of each expression in the relevant database statement;
eliminating a superfluous alias in the relevant database statement;
substituting a common alias for an alias in the relevant database statement; and
reordering a sequence of identifiers in the relevant database statement to a predefined, identifier sequence; and
reducing the formatted, relevant database statements into a representative set of database statements.

11. The computer program product of claim 10, wherein the program code for selecting relevant database statements comprises:
selecting a database statement from the database workload if the database statement references a target database table.

12. The computer program product of claim 10 wherein the program code for selecting relevant database statements comprises:

selecting a database statement from the database workload if the database statement includes a Data Manipulation Language (DML) keyword.

13. The computer program product of claim 10 wherein the program code for reducing the formatted, relevant database statements comprises:

providing a hash table;

determining a first hash key for a first one of the formatted, relevant database statements;

storing the first hash key in the hash table;

determining a second hash key for a second one of the formatted, relevant database statements;

comparing the second hash key to the stored, first hash key; and storing the second hash key in the hash table if there is no match between the second hash key and the stored first hash key.

14. The computer program product of claims 13 wherein the program code for reducing the formatted, relevant database statements further comprises:

modifying a statistic associated with the stored, first hash key if there is a match between the second hash key and the stored first hash key.

15. An automated system for reducing a database workload to a representative set of database statements, the system comprising:

means for selecting relevant database statements from the database workload;

means for processing the relevant database statements into a standardized format;

for each relevant database statement, the means for processing including at least one of:

means for substituting a root value for a synonym in a relevant database statement;

means for substituting a simple operator keyword segment for a complex operator keyword segment in the relevant database statement;

means for substituting a common parameter for a parameter in the relevant database statement;

means for reordering a sequence of parameters in the relevant database statement to a predefined, parameter sequence;

means for standardizing use of delimiters in the relevant database statement;

means for standardizing a case of each expression in the relevant database statement;

means for eliminating a superfluous alias in the relevant database statement;

means for substituting a common alias for an alias in the relevant database statement; and means for reordering a sequence of identifiers in the relevant database statement to a predefined, identifier sequence; and means for reducing the formatted, relevant database statements into a representative set of database statements.

16. The system of claim 15, wherein the means for selecting relevant database statements comprises:

means for selecting a database statement from the database workload if the database statement references a target database table.

17. The system of claim 15 wherein the means for selecting relevant database statements comprises:

means for selecting a database statement from the database workload if the database statement includes a Data Manipulation Language (DML) keyword.

18. The system of claim 15 wherein the means for reducing the formatted, relevant database statements comprises:

means for providing a hash table;

means for determining a first hash key for a first one of the formatted, relevant database statements;

means for storing the first hash key in the hash table;

means for determining a second hash key for a second one of the formatted, relevant database statements;

means for comparing the second hash key to the stored, first hash key; and means for storing the second hash key in the hash table if there is no match between the second hash key and the stored first hash key.

19. The system of claim 18 wherein the means for reducing the formatted, relevant database statements further comprises:

means for modifying a statistic associated with the stored, first hash key if there is a match between the second hash key and the stored first hash key.

20. A method for reducing a database workload to a representative set of database statements, the method comprising:

selecting relevant database statements from the database workload by selecting a database statement from the database workload if the database statement references a target database table or if the database statement includes a Data Manipulation Language (DML) keyword;

standardizing a format of the relevant database statements by, for each relevant database statement:

substituting a root value for a synonym in a relevant database statement;

substituting a simple operator keyword segment for a complex operator keyword segment in the relevant database statement;

substituting a common parameter for a parameter in the relevant database statement;

reordering a sequence of parameters in the relevant database statement to a predefined, parameter sequence;

standardizing use of delimiters in the relevant database statement;

standardizing a case of each expression in the relevant database statement;

eliminating a superfluous alias in the relevant database statement;

substituting a common alias for an alias in the relevant database statement; and reordering a sequence of identifiers in the relevant database statement to a predefined, identifier sequence; and reducing the formatted, relevant database statements into a representative set of database statements.

21. The method of claim 20 wherein reducing the formatted, relevant database statements comprises:

providing a hash table;

determining a first hash key for a first one of the formatted, relevant database statements;

storing the first hash key in the hash table;

determining a second hash key for a second one of the formatted, relevant database statements;

comparing the second hash key to the stored, first hash key; and storing the second hash key in the hash table if there is no match between the second hash key and the stored first hash key.

22. The method of claim 21 wherein reducing the formatted, relevant database statements further comprises:

modifying a statistic associated with the stored, first hash key if there is a match between the second hash key and the stored first hash key.

23. A system for providing a reduced database workload to an index tuning mechanism, the system comprising:

a database workload source;

a workload filter, fed by the workload source, to select relevant database statements from the workload source;

a formatting system, fed by the workload filter, to standardize a format of the relevant database statements, the formatting system including:

a synonym filter to standardize a representation of each occurrence of a synonym in the relevant database statements;

an operator filter to standardize a representation of each occurrence of an operator in the relevant database statements;

a parameter filter to standardize a representation of each occurrence of a parameter in the relevant database statements;

a delimiter filter to standardize usage of a delimiter in the relevant database statements;

a case filter to standardize a case of each expression in the relevant database statements;

an alias filter to standardize a representation of each occurrence of an alias in the relevant database statements; and an identifier filter to standardize a representation of each occurrence of an identifier in the relevant database statements; and a mechanism to collapse the standardized database statements into a unique set of statements, including:

a hash table including a hash key of each representative database statement selected from the relevant database statements and a statistic associated with each hash key.

* * * * *